(12) United States Patent
Rao

(10) Patent No.: US 10,425,244 B2
(45) Date of Patent: Sep. 24, 2019

(54) MACHINE TO MACHINE NETWORK AUTOMATION PLATFORM WITH INTUITIVE NETWORK CONFIGURATION AND DEPLOYMENT MANAGEMENT INTERFACE

(71) Applicant: Prashanth Rao, Wilmington, MA (US)

(72) Inventor: Prashanth Rao, Wilmington, MA (US)

( * ) Notice: Subject to any disclaimer, the term of this patent is extended or adjusted under 35 U.S.C. 154(b) by 126 days.

(21) Appl. No.: 15/178,336

(22) Filed: Jun. 9, 2016

(65) Prior Publication Data

US 2017/0170977 A1 Jun. 15, 2017

Related U.S. Application Data

(60) Provisional application No. 62/145,986, filed on Apr. 10, 2015.

(51) Int. Cl.
  *H04L 12/28* (2006.01)
  *H04L 12/24* (2006.01)
  *G06Q 30/02* (2012.01)

(52) U.S. Cl.
  CPC ..... *H04L 12/2814* (2013.01); *G06Q 30/0276* (2013.01); *H04L 2012/2841* (2013.01)

(58) Field of Classification Search
  None
  See application file for complete search history.

(56) References Cited

U.S. PATENT DOCUMENTS

| | | | | |
|---|---|---|---|---|
| 7,171,624 B2* | 1/2007 | Baldwin | ............... | G06F 3/0481 715/733 |
| 7,272,815 B1* | 9/2007 | Eldridge | ................... | G06F 8/71 707/999.009 |
| 7,430,593 B2* | 9/2008 | Baldwin | ............. | H04L 67/1097 709/223 |
| 8,612,870 B2* | 12/2013 | Kodosky | ............ | G05B 19/0426 715/762 |
| 8,615,606 B2* | 12/2013 | Gentry | .................. | G06F 15/173 709/201 |
| 9,497,070 B2* | 11/2016 | Mungo | ................... | H04W 4/70 |

(Continued)

*Primary Examiner* — Kenny S Lin

(57) ABSTRACT

This application discloses embodiments of systems and methods for a flexible automation system for a network of connected machines. In some embodiments, the network of connected machines uses one or more of wireless protocols such as Zigbee, ZWave, Wi-Fi, Bluetooth and other IEEE 802.15.4 protocols. The systems and methods provide a flexible automation system where end users can customize the operation of the network of connected machines to suit the automation logic desired. Intuitive graphical user interface methods are provided to allow users to implement their custom logic without requiring custom software programming. Systems and methods are provided to customize downloadable and sharable automation software applications to work in a variety of non-identical network configurations. Intuitive graphical user interface methods are provided to allow users to custom configure automation rules for their network of machines by remote collaboration or allowing remote configuring by experts. In one embodiment, a major goal of the disclosures is to provide many methods to a user to implement complex automation logic, for his network, his way, as he imagined it and without need for programming on part of the user.

5 Claims, 11 Drawing Sheets

Customizing Automation Software Applications Using GUI (Part 1 of 4)

(56) References Cited

U.S. PATENT DOCUMENTS

2009/0307255 A1* 12/2009 Park .................. G06Q 10/10
2014/0280934 A1*  9/2014 Reagan ............... H04L 47/70
                                                    709/225
2015/0309702 A1* 10/2015 Butler ............... G06F 3/0482
                                                    715/771

* cited by examiner

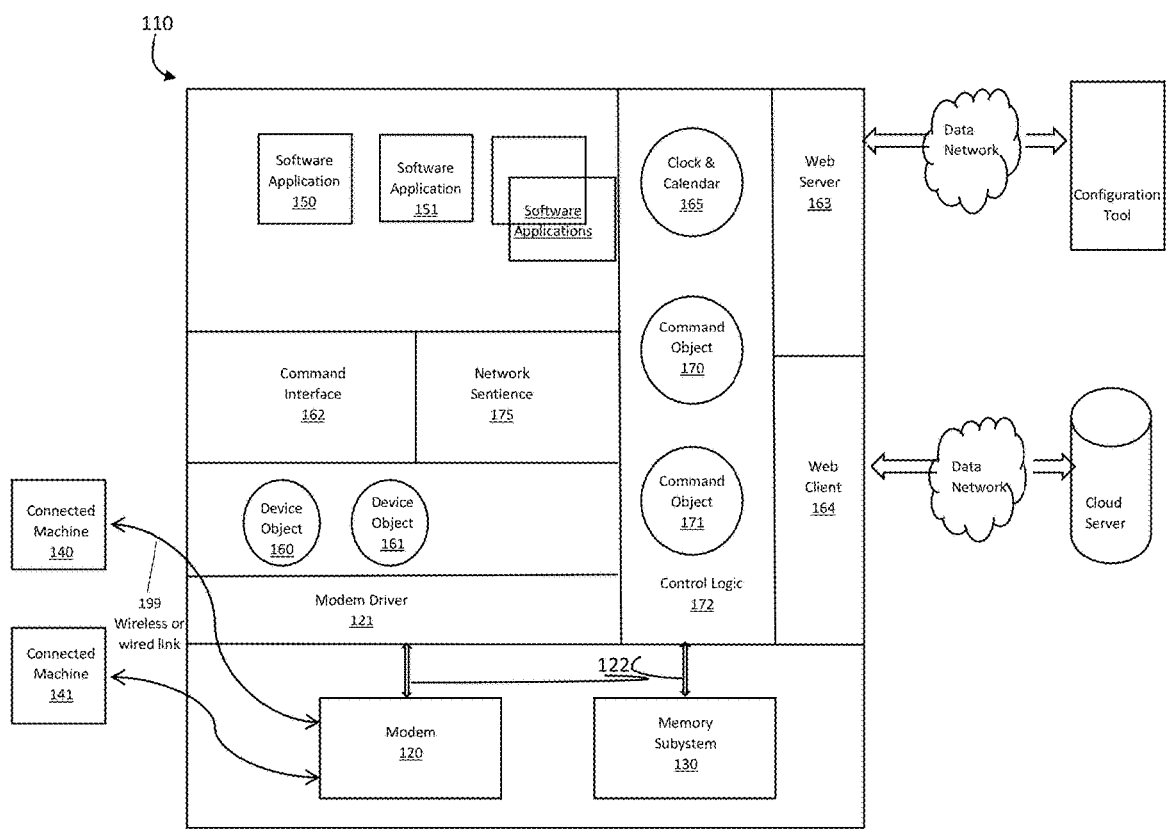
FIG.1 Architecture of the Controller

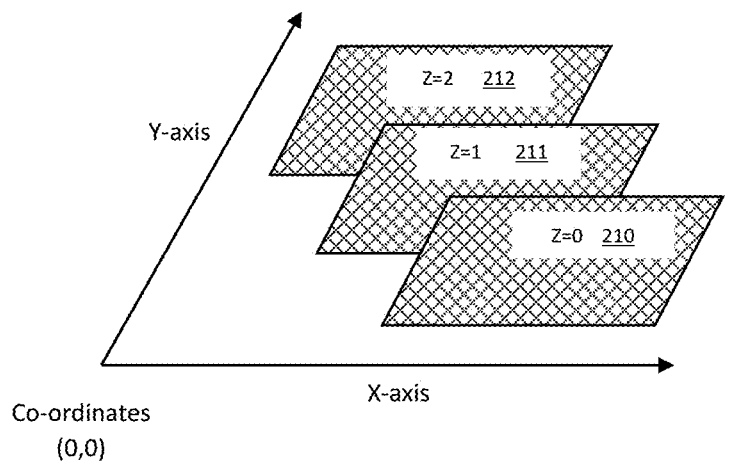
FIG.2 Recording Location of a Connected Machine

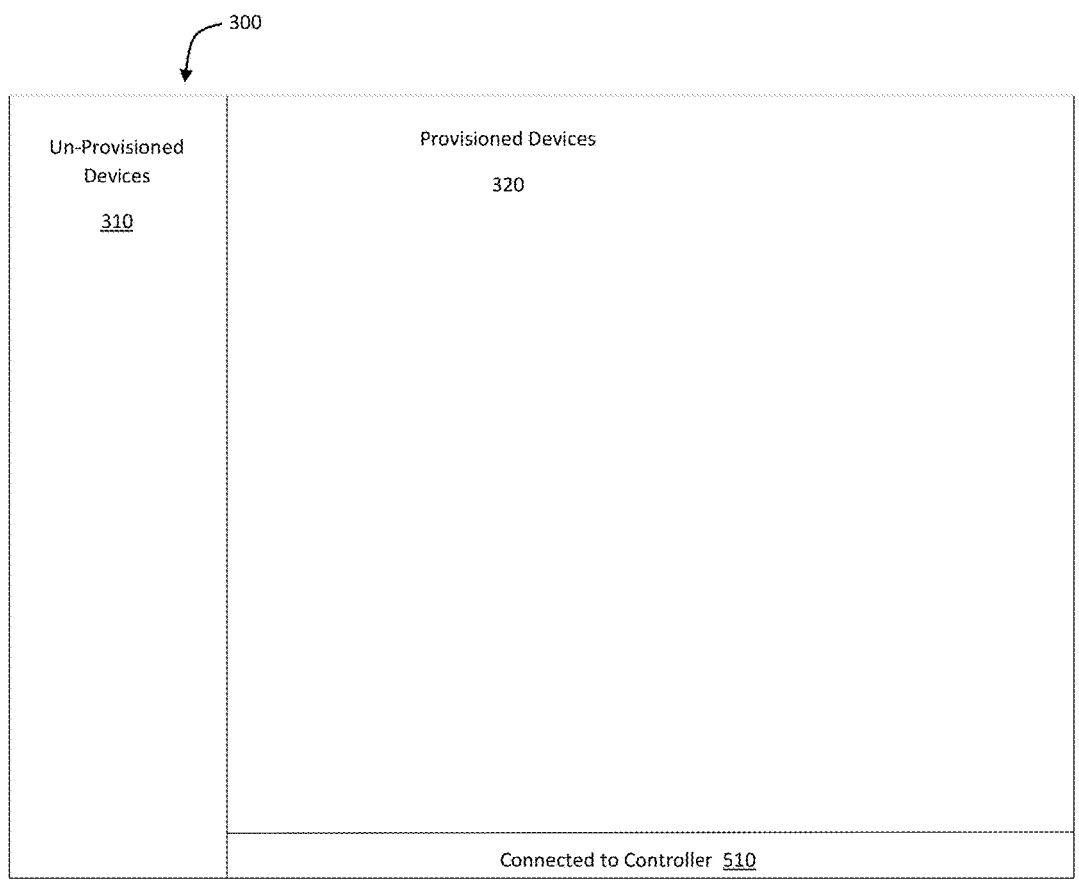
FIG.3 GUI for a network Without any Connected Machines

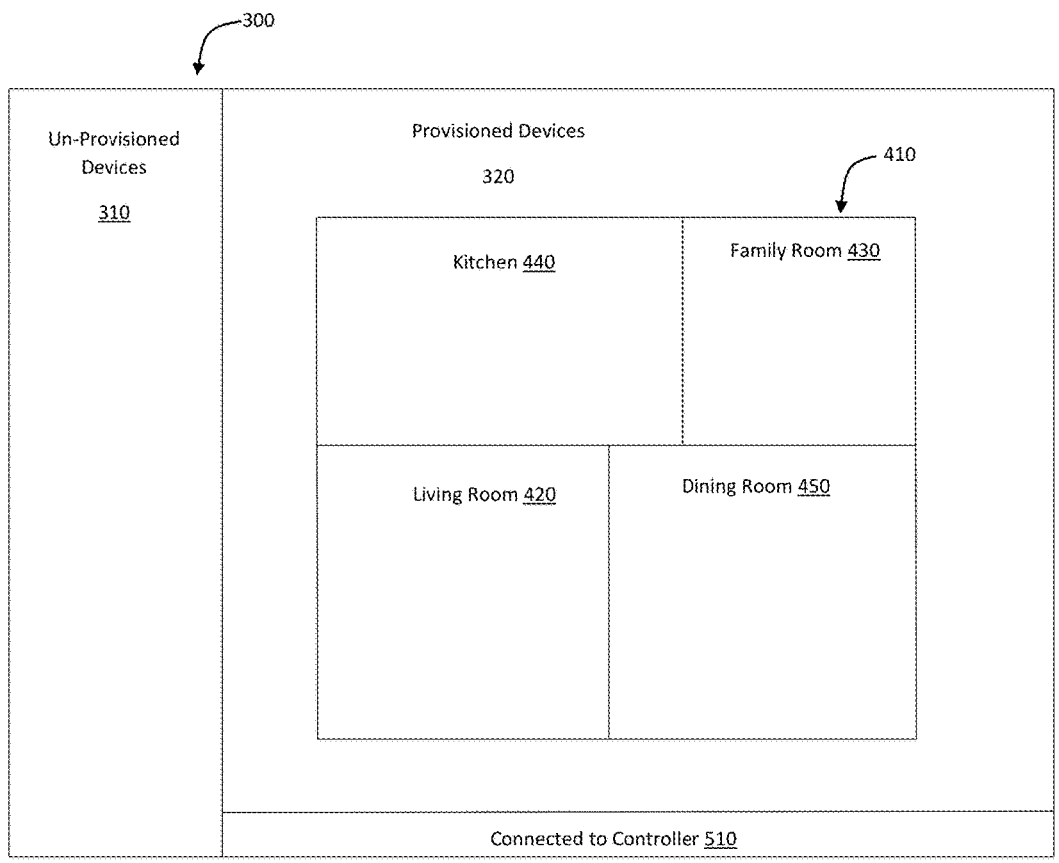
FIG.4 GUI with User Supplied Schema

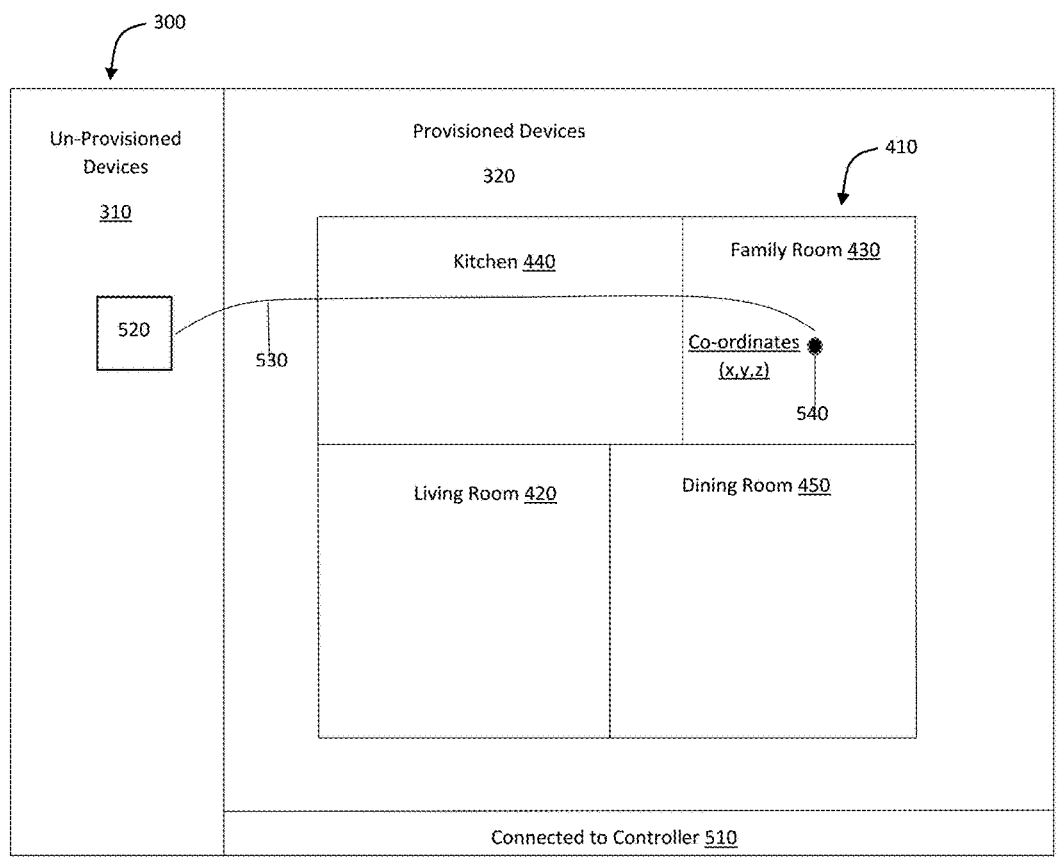
FIG.5 GUI with User Supplied Schema and Connected Thermometer

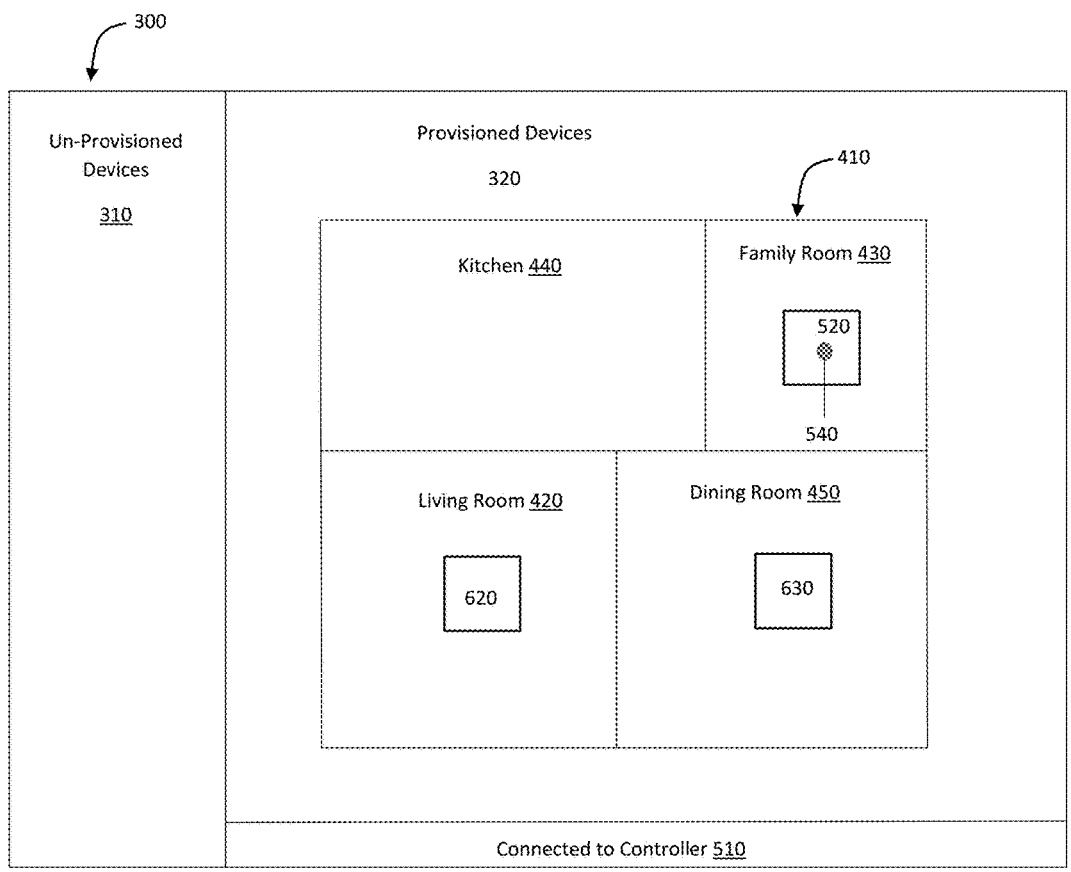
FIG.6 GUI with User Supplied Schema and Three Connected Devices

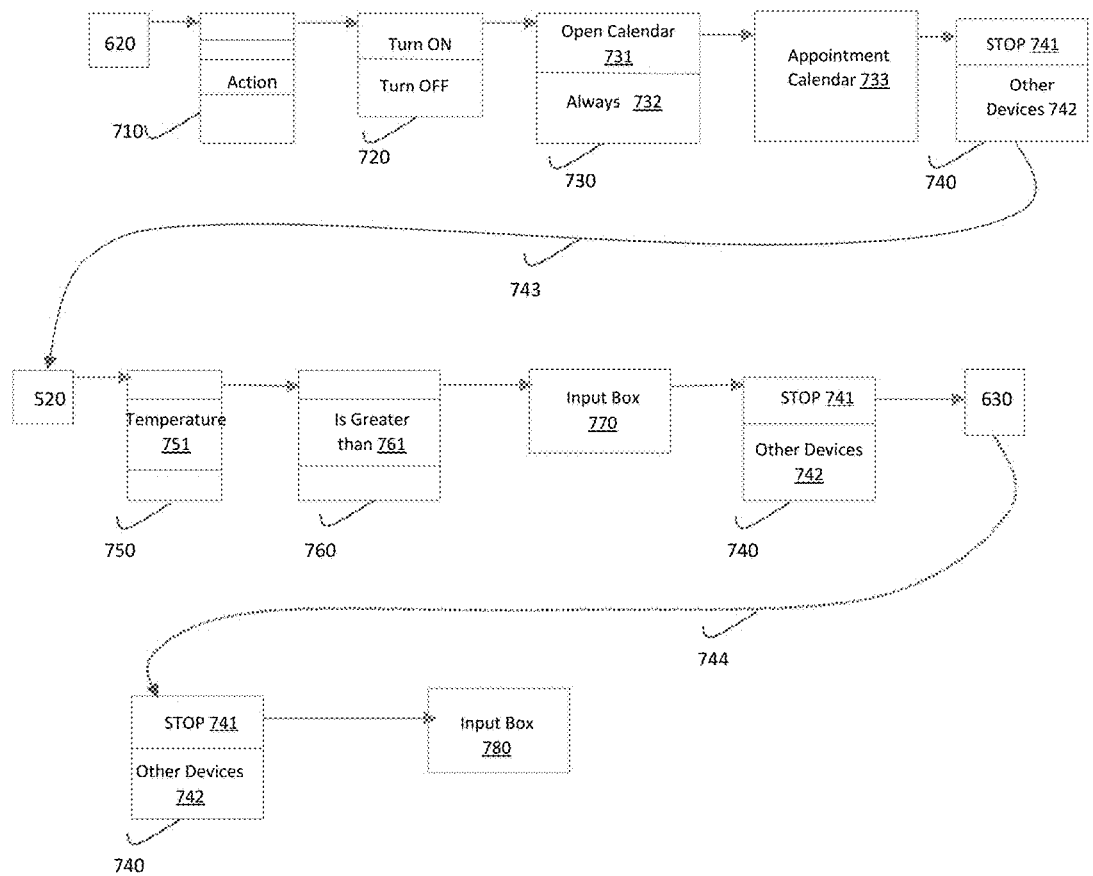
FIG.7 Configuring Custom Automation Rules Using the GUI

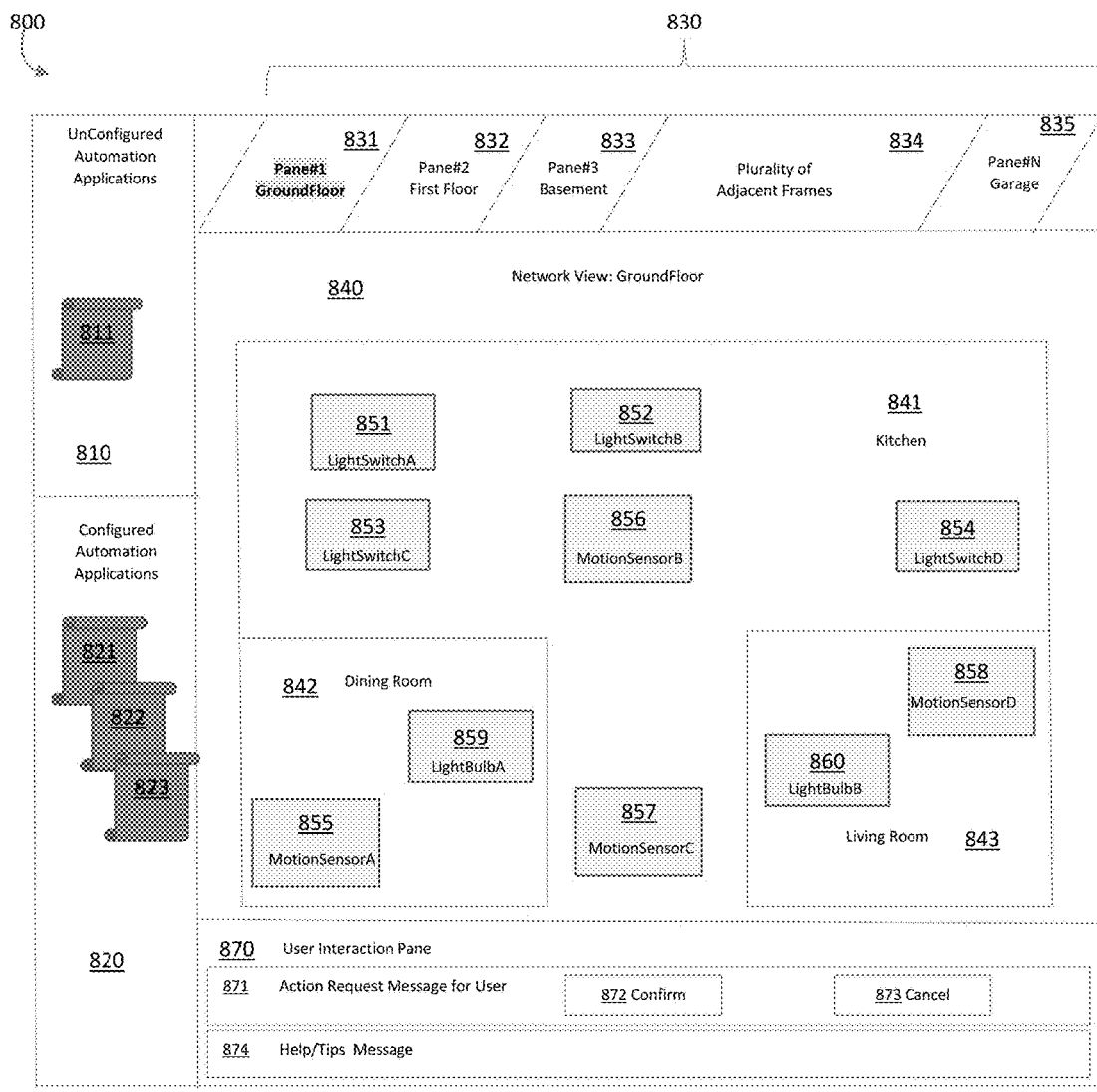
FIG.8 Customizing Automation Software Applications Using GUI (Part 1 of 4)

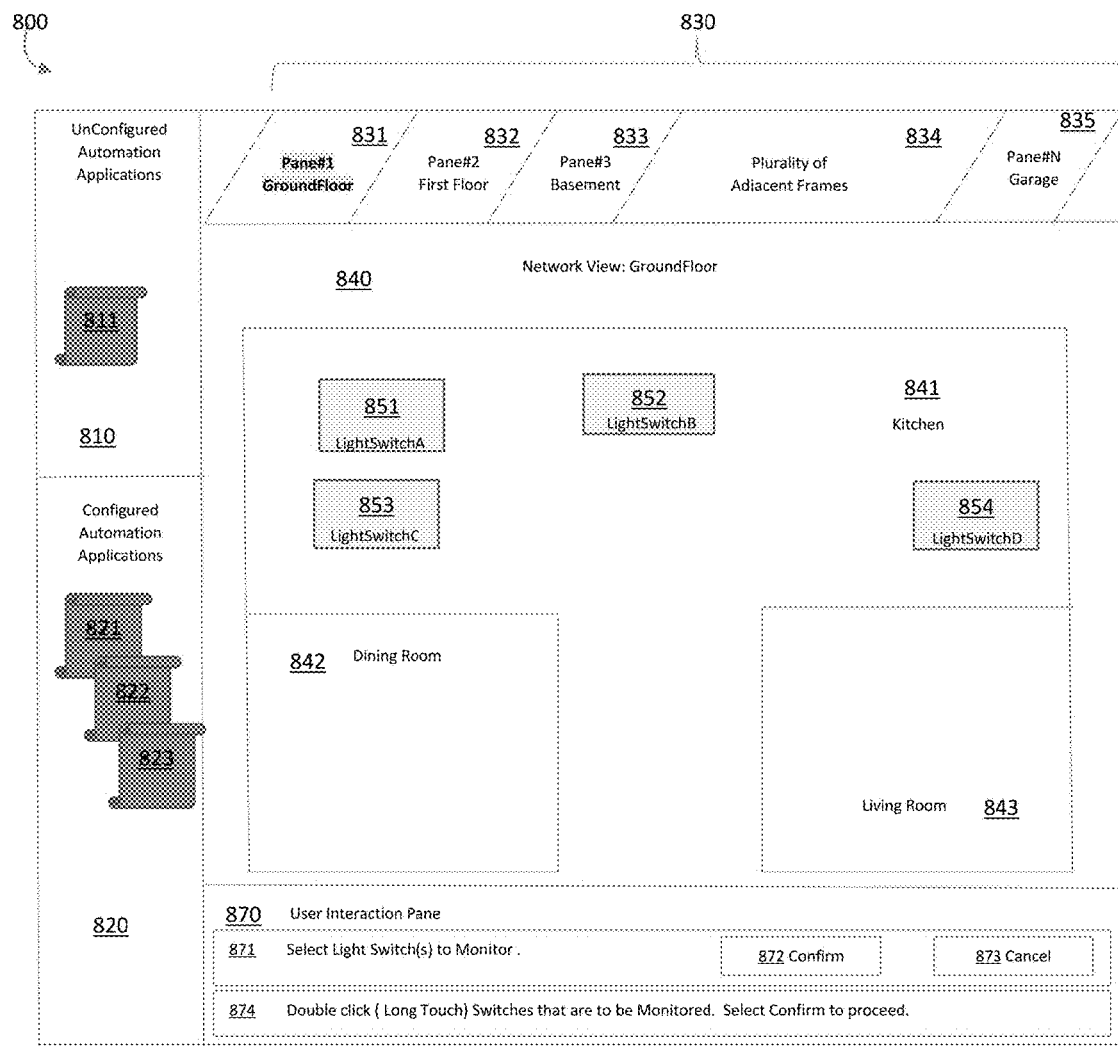
FIG.9 Customizing Automation Software Applications Using GUI (Part 2 of 4)

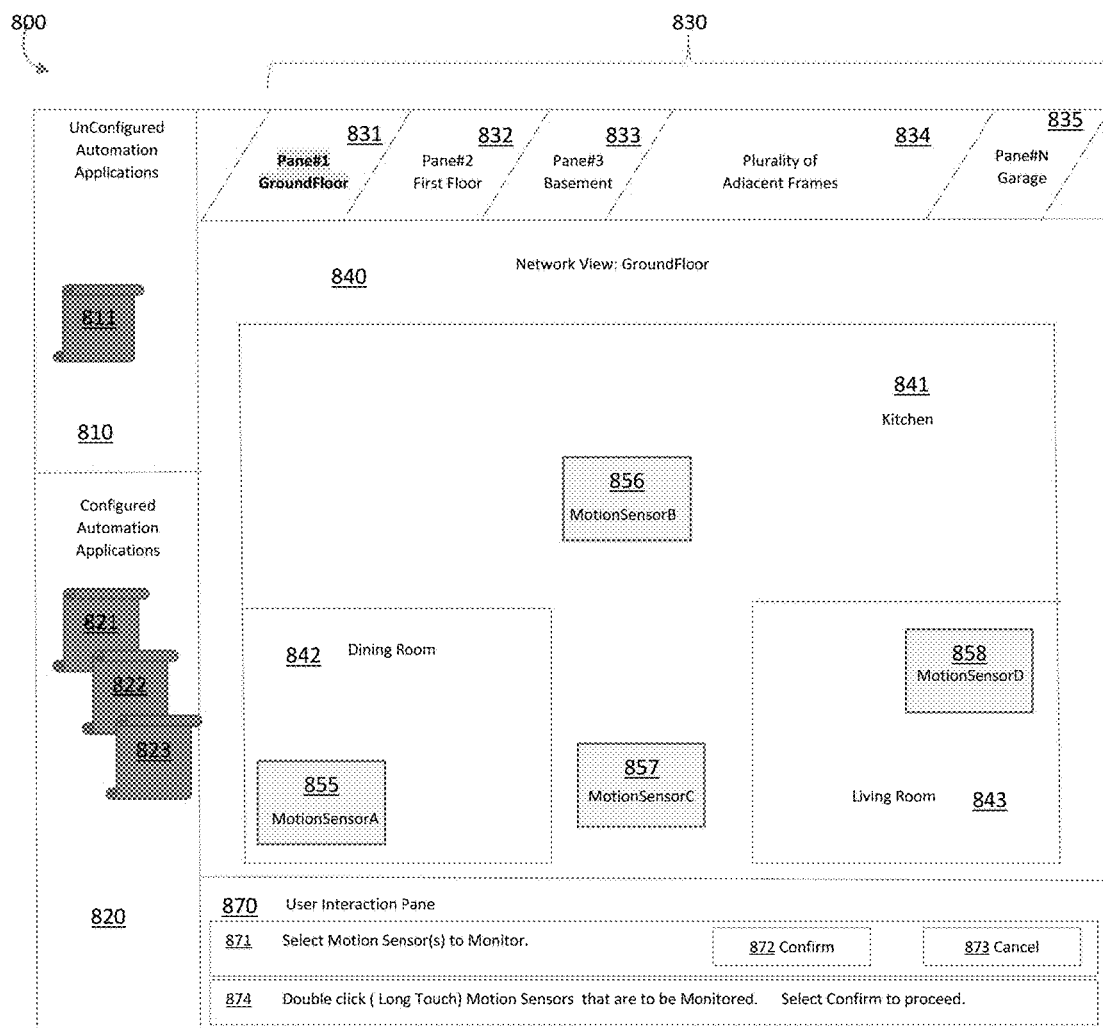
FIG.10 Customizing Automation Software Applications Using GUI (Part 3 of 4)

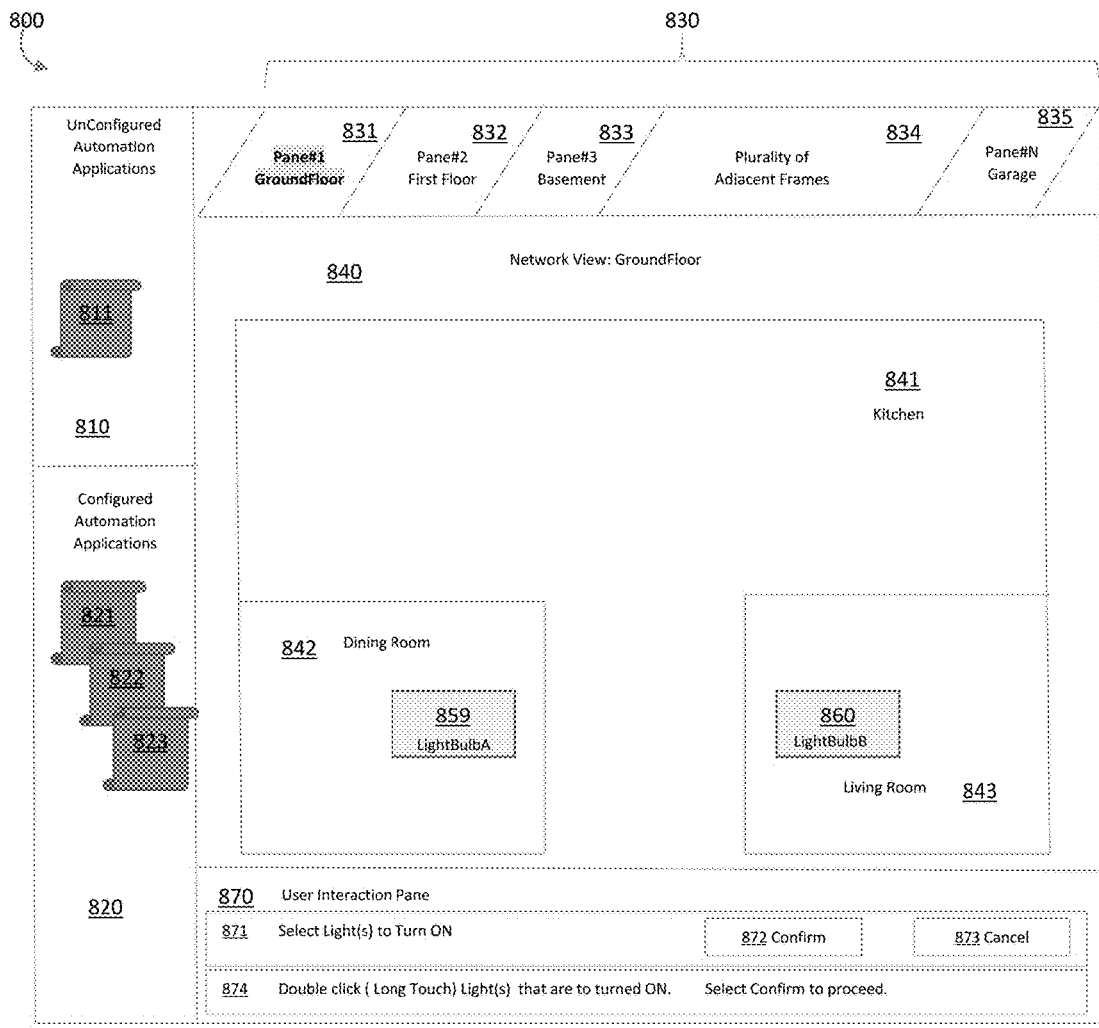
FIG.11 Customizing Automation Software Applications Using GUI (Part 4 of 4)

MACHINE TO MACHINE NETWORK AUTOMATION PLATFORM WITH INTUITIVE NETWORK CONFIGURATION AND DEPLOYMENT MANAGEMENT INTERFACE

CROSS-REFERENCE TO RELATED APPLICATIONS

This application claims the benefit under 35 U.S.C. § 119 of the U.S. Provisional Patent Application No. 62/145,986, entitled "Machine to Machine Network Automation Platform with Intuitive Network Configuration and Deployment Management Interface" filed on Apr. 10, 2015.

BACKGROUND

The ever-increasing need for automation has brought forth the need for connected machines to work in unison as a network of machines whose actions can be intelligently directed by programmable and adaptive computer implemented network intelligence. In such automation solutions, connected machines communicate with a command and control hub that provides computing and data processing functions for implementing the network intelligence. In some embodiments, connected machines are sensors and devices such as thermostats, light sensors, moisture sensors, weight sensors, electric current and voltage sensors, switches, and motors, heating and cooling equipment. In some embodiments, the connected machines communicate with the network over wireless data networks using protocols such as Zigbee, Zwave, WiFi, Bluetooth, R4FCE and various flavors of IEEE 802.15.4 based protocols.

Many companies in the world such as Lowe's, Smarthings, Wink, Lowe's IRIS etc have recently been offering automation solutions. However, automation solutions currently available in the market have several disadvantages.

Such solutions are capable of providing only a narrow set of specific automation tasks such as thermostat control, security alarm control, lighting control etc.

Such solutions are made for a specific set of use cases with a specific set of connected machines.

Such automation solutions do not allow users of the network of connected machines to build, provision and control said network according to the users' specific needs, without the need for developing software applications. In other words, complex automation logic cannot be implemented by an average smartphone user who can imagine what the automatic logic should be but cannot himself implement the logic as functioning software.

Such automation solutions do not provide a platform for distributing automation logic as customizable software applications that can then be further customized by the user to meet a user's specific automation needs the user's specific network.

Solutions to the aforementioned disadvantages are important in bringing automation solutions to an even larger number of people and processes.

FIELD

The present application relates to systems and methods of providing a flexible automation system for a network of communicating machines. In some embodiments, the communicating machines may use one or more of the following protocols: Zigbee, Zwave, WiFi, Bluetooth, R4FCE and various flavors of IEEE 802.15.4 based protocols. Other embodiments using other data communication protocols exist.

SUMMARY OF THE INVENTION

This application discloses embodiments of systems and methods of a flexible automation system for a network of connected machines.

In some embodiments, the automation system is not limited to a specific set of automation tasks but instead enables users of the automation system to create and operate their network of connected machines in embodiments that satisfy their specific automation needs.

In some embodiments, the automation system for a network of connected machines can configure, develop and deploy for each user, a network of his/her own specific automation needs. In other words, in some embodiments, a common automation system delivers to users automation of "to each his own" network.

In some embodiments, the automation system provides a common platform that enables many disparate and independent automation solutions to co-exist and jointly operate the network of connected machines.

In some embodiments, the automation system provides methods for multitudes of disparate automation solutions to be delivered in the form of downloadable software applications that run on the common platform.

In some embodiments the common automation platform may be provided on self-contained, computing machine. In other embodiments, the common platform may be provided by a combination of computing machines local to the users' location and remote cloud computing services. Examples of cloud computing services are Amazon AWS and Microsoft Azure.

In some embodiments, data gathered from the connected machines in the network can be used to enable innovative e-commerce services. For example, if the automation solution identifies that a refrigerator exists in the network, the seller of the automation system may contact the owner of the network about selling a filter for the refrigerator. In another example, the automation solution provider may provide user manuals for one or more of the connected machines in the network to the owner of the connected machines as a service.

In some embodiments, the automation system provides an intuitive graphical user interface in the automation system that allows users to configure and monitor the network of connected machines and provision rules of operation of the network of connected machines.

BRIEF DESCRIPTION OF THE DRAWINGS

FIG. 1 is an illustration of the architecture of the Controller, an embodiment of the disclosed automation system.

FIG. 2 is an illustration of the scheme to record the location of a connected machine.

FIG. 3 is an illustration of the Graphical User Interface of an embodiment of the automation system before any devices have joined the network.

FIG. 4 is an illustration of the Graphical User Interface of an embodiment of the automation system where a user has supplied a graphical schema by drawing a floor plan on the screen.

FIG. 5 is an illustration of the Graphical User Interface of an embodiment of the automation system where a user has supplied a graphical schema by drawing a floor plan on the screen and powered on a connected thermometer.

FIG. 6 is an illustration of the Graphical User Interface of an embodiment of the automation system where a user has supplied a graphical schema by drawing a floor plan on the screen, powered on three connected devices and moved them to their representative locations.

FIG. 7 is an illustration of the steps executed by a user in configuring custom automation rules in one embodiment of the Graphical User Interface of the automation system.

FIG. 8 is an illustration of a snapshot of an embodiment of the GUI of the automation system used in configuring downloaded automation software applications (part 1 of 4)

FIG. 9 is an illustration of a snapshot of an embodiment of the GUI of the automation system used in configuring downloaded automation software applications (part 2 of 4)

FIG. 10 is an illustration of a snapshot of an embodiment of the GUI of the automation system used in configuring downloaded automation software applications (part 3 of 4)

FIG. 11 is an illustration of a snapshot of an embodiment of the GUI of the automation system used in configuring downloaded automation software applications (part 4 of 4)

DETAILED DESCRIPTION OF THE INVENTION

This application discloses embodiments of systems and methods of a flexible automation system for a network of connected machines.

Controller

In one embodiment, a device hereinafter referred to as "Controller", is provided for controlling the operation of a plurality of connected machines in a network of connected machines, said device comprising:
(a) computing hardware, modem and memory;
(b) a software machine that acts as a commander and coordinator of multiple connected machines in the network In some embodiments, the Controller may be provided on self-contained, computing machine. In other embodiments, the common platform may be provided by a combination of computing machines local to the users' location and remote cloud computing services. Examples of cloud computing services are Amazon AWS and Microsoft Azure.

In some embodiments, the Controller communicates with connected machines in its network using protocols such as Zigbee, Z-wave, R4FCE, Bluetooth, Wi-Fi and various flavors of IEEE 802.15.4 based protocols.

In some embodiments, the Controller communicates with connected machines in its network over wireless links.

The Controller runs software applications that take as input, data from a first set of one or more connected machines communicating with it and generate commands that are communicated to a second set of one or more connected machines, directing said second set of connected machines to take specific actions.

The block diagram the Controller is shown in FIG. 1.
110 is the block diagram of the Controller.
120 is a modem that may be present in the Controller. The modem is responsible for providing data connectivity between the Controller and the connected machines in the network that are managed and controlled by the Controller. The modem can be capable of any number of protocols such as Zigbee, Z-wave, R4FCE, Bluetooth, Wi-Fi etc. There may be a plurality of modems in the Controller.
121 is a representation of software called Modem Driver, which enables operation of the modem.
122 is a representation of interconnects between the modem, memory and the Controller.
130 is a memory unit on the Controller.
140 is a machine communicating with the Controller via the modem. The machine can connect to the Controller over or more data communication protocols such as ZigBee, Z-wave, R4FCE, Bluetooth, Wi-Fi etc. 141 is a yet another machine of the type represented by 140.
150 is a representation of one instance of a software application that consists of computer instructions to control and co-ordinate the operation of a plurality of connected machines in the network. 151 is yet another distinct and separate software application. These software applications can be downloaded to the Controller's memory from a remote source via a data network or from a physically connected memory device such as flash memory, hard drive etc, at any time during the Controller's operation.

Methods of Obtaining and Recording in Computer Readable Form Information about the Composition and Operation of the Network of Connected Machines Device Object In another embodiment, a method is provided for enabling the representation of information about connected machines communicating with the Controller as computer readable data objects by creating a data model representation of said machines, comprising the steps:
(a) defining a list of data elements (said data element hereinafter referred to as "Attribute"), that describes the characteristics and operational capabilities of said machines;
(b) obtaining information on said characteristics and operational capabilities of said machines by way of the Controller communicating with said machines;
(c) recording information obtained in step (b)in a computer readable form;
whereby computer instructions executing on the Controller may use said computer readable data objects (said computer readable data object hereinafter referred to as "Device Object") to achieve command and control over said machines.

The Device Object is a collection of Attributes. The Device Object is the computer readable representation of information of a connected machine.

Presented below are some examples of possible data elements, also known as Attributes, in said data model representation.

Identity: further comprising but not limited to Device Name, Device Model Number, Date of deployment, Manufacturer name Given Name: a string of characters assigned to a machine by a configuration tool. For example, Given Name could be "Living Room Lamp".

Display Location: location at which the object will be displayed on a graphical user interface. The location is recorded in a 3 dimensional co-ordinate system of (x,y,z) as shown in FIG. 2. The coordinates x and y mark the location of the device on a 2 dimensional rectangular coordinate system. The z coordinate specifies the plane on which device is located from amongst a multiplicity of planes. In one embodiment, the z coordinate could indicate the floor level and the (x,y) coordinates could mark the machine's location on the map of the floor level on the graphical user interface. In other embodiments, the z co-ordinate could indicate numbered rooms of a hotel.

FIG. 2 illustrates one embodiment of the 3 dimensional co-ordinate system. In this embodiment, the ordinate z represents different floors in a multistory building. 210 is a representative map of the basement of a building where some connected machines are located. The ordinate z for any location on the basement is 0. Similarly, 211 and 222 are representative maps of the first and second floors of the building, respectively. The ordinate z has values 1 and 2 for 211 and 212, respectively.

Provisioned: This data item indicates whether the machine has been configured and made ready for operation.

List of Attributes & Value Pairs: This is a list of the pair comprising: Attribute and the value of the Attribute the machine is capable of reporting to the Controller. The Controller and the physical machine represented by the Device Object communicate with each other to keep the values of the Attributes current and updated.

For example, for a wireless thermostat, temperature is an Attribute and 98 degrees Fahrenheit its value.

List of Supported Commands: This is a list of commands a machine is capable of accepting to perform designated actions supported by said machine List of Automation Logic : This is a list of automation rules of which the machine represented by the Device Object is the target. In other words, all the automation rules that causes an action to be performed by a connected machine are recorded in this list.

160 is an instance of the Device Object.

161 is yet another instance of the Device Object.

162, labeled Command Interface is the representation of a collection of procedures that enable software applications to send commands and configurations to any machine communicating with the Controller.

Command Object

In some embodiments, the automation system provides a mechanism to specify automation rules and logic in computer readable form that has the following properties so that the rules can be repeatedly applied, stored and restored from memory and replicated on multiple networks.

Methods are required to inform the automation system via a computer readable object that a specified action has to be performed on one or more specified connected machines in the network, on a specified schedule, when all of a plurality of conditions in the network are simultaneously true for at least a specified amount of time.

In some embodiments, a method is provided that enables the representation of rules of operation governing connected machines in a network of connected machines and interdependencies of operation between one or more of said machines as computer readable data objects (said computer readable data object hereinafter referred to as "Command Object") by creating a data model representation of said rules wherein said data model comprises:

(a) a unique name or identifier to uniquely identify said rule, (b) a computer readable text(said computer readable text hereinafter referred to as "Command"), implying an action on a device communicating with the Controller, (c) a list of logical conditions involving one or more Attributes of one or more connected machines in the network that have to be simultaneously true for the action specified by said Command of (b), wherein each logical condition comprises:
 (i) a measurable entity accessible on a selected machine on said network of connected machines,
 (ii) a logical expression that can be either true or false, specified on said measurable quantity of (i) using logical operators such as NOT, AND, OR; and arithmetic operators such as greater than or equal to , less than or equal to, greater than, less than, equal to.

(d) a temporal schedule for executing said Command.

(e) a specification of the time duration for which all of the logical conditions of (c) must be simultaneously true for the actions of the Command of (b)

In some embodiments, a method is provided for constructing the Command, comprising the steps of:

(a) classifying the action a set of connected machines in the network of connected machines may perform into one of the following categories:
 (i) turn on,
 (ii) turn off,
 (iii) set at a specifiable value a configurable and measurable entity on said machine;

(b) specifying the machine which may perform said action

In some embodiments, the Command Object may be specified in a syntax that is lexically similar to written languages such as English so that the intent of the Command Object can be intuitively clear to human users examining the contents of the Command Object. This embodiment is particularly useful when a user creates a Command using a graphical network configuration tool and wants to intuitively verify the correctness of the created Command.

Those skilled in the art of syntax specification for computing systems recognize the expression <some_place_holder_name> as a placeholder for values. The expression inside the place holder, designated as "some_place_holder_name" may be substituted by a plurality of values.

In one embodiment, the Command Object may be specified with the syntax
<Command><Target_Device Object_1>WITH SCHEDULE <schedule from Calendar: Object_1>
WHEN <condition_1>AND <condition_2>AND . . . <condition_n>
FOR <true_for_at least_time_period>
Wherein,
(1)<Command>is the Command operating on the Device Object <Target_Device_Object_1>or Attribute thereof, or a collection of Device Objects or their Attributes
(2) <condition_x>(where x is a token for a plurality of conditions 1,2 . . . n) further reduces to the syntax
 <selectedDevice_Object's Attribute><logical or comparison specification>
 wherein,
 (a) <selectedDevice_Object>is the Device Object of the machine selected in the condition
 (b)<selectedDevice_Object's Attribute>is the Attribute from the selected Device Object in the condition
 (c) <logical or comparison specification>is the logical or arithmetic evaluation involving the selected Attribute that must be true for the condition to be true (3) <true_for_at least_time_period> is the length of time for which all the conditions specified in the Command Object, must be true for <Command> to be executed whereby, the rule that a specified action take place on a specified set of connected machines on a specified schedule when the conditions of one, none or more connected machines in the network meet specified criteria is provided in a computer readable form.

As an example, consider two Device Objects, one representing an ON/OFF switch that controls electrical power to a fan and another representing a thermostat. Further, consider the ON/OFF switch. It has a Given Name, LIVING_ROOM_FAN_SWITCH. This Device Object has in its List of Commands: TURN_ON and TURN_OFF.

Now, consider the thermostat. The thermostat has a Given Name, LIVING_ROOM_THERMOSTAT. The thermostat has an Attribute, TEMPERATURE. The values of this Attribute are periodically updated in the thermostat's Device Object by way of communication between the Controller and the thermostat.

Now consider an operating rule to turn on the fan by way of controlling the ON/OFF switch whenever the thermostat measures a temperature of greater than 75 degrees Fahrenheit between 9am and 9pm every day. Let us call this operating rule by a unique name FAN_ON_IF_HOTTER_THAN_75.

This Command Object representation of this example rule may comprise:
Command Name: FAN_ON_IF_HOTTER_THAN_75
Command: TURN_ON LIVING_ROOM_FAN_SWITCH WHEN LIVING_ROOM_THERMOSTAT's TEMPERATURE MORE THAN 75.
Schedule: All calendar days between 9:00 am and 9 pm In some embodiments, a software machine can read a Command Object and generate software applications of the type described by 150 and 151. The importance of this embodiment is that rules for automation of connected devices may be distributed and shared in human readable, editable and comprehendible form that when processed by the automation system, generates computer code that automates the network of connected machines. This is akin to the user of the automation system writing an English-like sentence expressing an automation rule according to the syntax of the Command Object, passing the text to the automation system and the automation system understanding the intent of the user and generating computer instructions to achieve the same.

163 is a Web Server application on the Controller that allows connectivity with remote computers and input devices such as smartphones, tablets and other data input devices to configure, manage and program intelligence on the Controller by way of any number of downloadable software applications, such as 150 and 151, and also by way of Command Objects such as 170.

In some embodiments, the web server may provide web services that allow the exchange of Device Objects and Command Objects between the Controller and a configuration tool capable of communicating with the web server over data networks.

164 is a Web Client application. The Web Client application may connect to a remote server to back up and restore operational data of the Controller.

165 is a representation of a computer readable calendar and clock (hereinafter calendar and clock together referred to as "Calendar") that allows the Controller to incorporate temporal schedules in the controlling the operation of the network of connected machines.

170 is a representation of an instance of the Command Object. 171 is a representation of yet another Command Object.

Network Sentience

In one embodiment, a method of automating the implementation of rules of operation in a network of machines is provided, comprising the steps of:
(a) the Controller monitoring the operating conditions of said machines;
(b) the Controller being informed of changes in operating conditions of a set of one or more said machines;
(c) the Controller directing a second set of one or more machines to perform actions as result of the changes in operating conditions of said first set of one or more said machines;
whereby the Controller observes the network of said machines and also directs said network of connected machines to perform a set of actions in response to changes in operating conditions of said network of connected machines.

In yet another embodiment, a method of automating the implementation of rules of operation in a network of connected machines is provided, comprising the steps of:
(a) the Controller monitoring the Attributes of the Device Objects
(b) the Controller, as result of the changes in said Attributes, directing a first set of one or more connected machines to take actions as specified in one or more Command Objects.

A software machine, hereinafter referred to as "Network Sentience", operates by continually monitoring the Attributes of all the Device Objects of the kind 160 and 161 in the network. Network Sentience enables software applications of the type described by 150 and 151 to be informed via computer executable instructions of any change in the values of one or more Attributes of one or more Device Objects.

175 is a representation of Network Sentience.

Creating Rich Context for Targeted Commercial Services

In one embodiment, a method of providing targeted commercial offers to the users of the network of connected machines is provided comprising the steps of:
(a) using information known to the Controller, such as make, model and year, condition of parts, of one or more connected machines in the network of connected machines to provide targeted services, advertisements and commercial offers to the users of said network of machines, wherein said information may be used to provide the context that is used in selecting said, advertisements and commercial offers.

In yet another embodiment, a method of providing targeted commercial offers to the users of the network of connected machines is provided, comprising the steps of:
(a) uploading information known to the Controller, such as make, model and year, condition of parts, of one or more connected machines in the network of a cloud server;
(b) using said uploaded information to form the context for serving contextually targeted advertisements and commercial offers to said users.

For example, if a brand X refrigerator communicates with the Controller, the Controller uploads device information such as model number, model year etc. to the cloud server. The Controller's owner's information is also present in the cloud server. In this specific example, the cloud server retrieves warranty and user manuals for the refrigerator from a remote database/internet and makes them available for the owner to access. Further, the manufacturer or other interested parties may send commercial offers for compatible parts, say a water filter compatible with refrigerator of brand X to the owner.

In another example, consider a humidifier machine that is known to the Controller. This humidifier may contain a UV lamp that needs to be replaced after 1000 hours of operation. The Controller may upload usage information of the humidifier to the cloud server. Upon reaching 1000 hours of operation, the cloud server may send advertisements and offers for a new UV lamp to the owner of the humidifier.

Intuitive User Interface for Automation of Connected Machines

Current automation solutions in the marketplace have a serious problem in that it is very difficult for an averagely skilled user, not particularly skilled in the science of computer programming to easily customize the network to meet the user's desired automation logic for the user's network of connected machines.

In some embodiments, an intuitive Graphical User Interface ("GUI") is provided that allows the averagely-skilled user to translate the user's intended logic to complex computer instructions by simple and intuitive inputs on the GUI. The GUI provided by the automation system that allows users to configure and monitor the network of connected machines and provision rules of operation of the network of machines.

In some embodiments, said graphical user interface comprises:

a set of graphical objects on a computer display, tablet, phone or similar display devices, representing connected machines in the network, wherein
(a) rules specifying the operating relationship between said selected graphical objects can be specified by using the graphical user interface, thereby specifying the rules of operation and configuration of the network of connected machines
(b) health and operational data of any connected machine in said network can be presented on the graphical user interface when the user selects the corresponding graphical representation of said machine In another embodiment, a method is provided that allows a user of the Controller to specify via a graphical user interface, the rules of operation of the network of machines managed by the Controller, comprising the steps of:
(a) Creating rules of operation of a set of said machines by successively selecting a graphical representation of a machine and specifying the relationship between said selected machine and a previously selected set of graphical representations of other machines in the network.

In another embodiment, a method is provided that allows a user of the Controller to specify via a graphical user interface, the rules of operation of the network of machines managed by the Controller, comprising the steps of:
(a) Creating Command Objects from rules of operation of a set of said machines by successively selecting a graphical representation of a machine and specifying the relationship between said selected machine and a previously selected set of graphical representations of other machines in the network.

In some embodiments, the computer readable graphical schema on which the information is rendered is a distinct and independent entity, different from the Device Objects and Command Objects. As a result, the same information can be displayed on a less capable device, say a small screen smartphone with a graphical schema of lesser sophistication as compared with a large computer display on which the same information can be rendered on a graphical schema of greater sophistication and detail.

Let us consider an embodiment that is used to create a GUI that allows a user to configure, control and deploy a network of machines. In this embodiment, the GUI is a web-page hosted on the web server 163 and viewed on a web browser on a remote computer that communicates with the web server 163.

In other embodiments, the GUI maybe be provided as a web page hosted on a computing machine different from the Controller. In a particular embodiment, the Controller communicates with the machine that generates the GUI over a data network such as the Internet and exchanges information needed by the GUI. This embodiment allows the construction of the scenario where the Controller can be placed in a user's home but the GUI is rendered from a publically accessible server such as the Amazon cloud service. As a result, a user can access the home automation network command and control interface from wherever the internet can be accessed.

As an example, let us consider the use of such a GUI in configuring a home automation network comprised of a Zigbee technology capable humidifier, a Zigbee technology capable thermometer, a Zigbee technology capable humidity sensor and a Controller equipped with a Zigbee modem.

The GUI 300 is shown in FIG. 3 before any of the connected machines in the network are powered on. The Controller is on and the user has pointed the web browser on his/her display device to the web address that uniquely identifies the Controller's web server 163. 310 is a section on the GUI where representations of machine that are powered on but not configured by the user, appear. 320 is a blank canvas on which the user implements his/her own graphical schema representing a graphical context for the network. Examples of user supplied graphical schema are a computer readable picture of a floor plan and on-screen computer aided drawings. 510 is message box that displays whether the GUI has established communication with the Controller or not.

The GUI 300 is shown in FIG. 4 wherein the user has created a simple graphical schema 410 by drawing a set of boxes representing his/her kitchen, living room, dining room and family room. The user has labeled these boxes to represent the floor plan of his/her home. 420, 430, 440 and 450 are the living room, family room, kitchen and dining room. This is the schema (hereinafter referred to as "First_Floor_Schema") of this particular user's home's first floor.

The GUI 300 is shown in FIG. 5 wherein the user has powered on the Controller and the Zigbee capable thermometer. When the thermometer communicates with the Controller, the Device Object corresponding to the thermometer is created on the Controller. The Controller populates this Device Object with the Identity, supported List of Attributes, List of Supported Commands etc that were learnt during the communication between the Controller and the thermometer. 520 is a graphical representation of the thermometer.

The Controller sends the corresponding Device Object or a subset thereof to the user's computer rendering the GUI, using web server 163, enabling the user to double click 520 to see relevant information from the corresponding Device Object. Thus, the user can identify the device and understand its capabilities. The user double clicks on 520 to open a drop down list containing an editable text field that allows the user to input the given name of the Device Object. Let us say, the user inputs "Family_Room_Thermometer" as the given name. The GUI synchronizes this updated information of the Device Object with the Device Object present in the Controller using communication with the web server 163.

Let us say, the user installs the thermometer in the family room. For the user's comprehension, the user drags 520 and drops it into the area marked Family Room. 530 represents the path of drag-and-drop. 540 is the end point of the drag and drop in the graphical schema referred to as First_Floor_Schema. 540 is represented as a (X,Y) location in rectangular two dimensional co-ordinate system in the graphical schema First_Floor_Schema. Consider a plurality of such two dimensional graphical schemas such as the First_Floor_Schema. Let an integer Z be an enumeration of a collection of such schemas. For example, First_Floor Schema may have a Z number of 1. A different graphical schema, say, a layout of the second floor may have a Z number of 2. Thus the location of the graphical representation of a machine in the GUI containing a plurality of graphical schemas may be represented by an ordered set of three numbers (X,Y,Z). This set of (X,Y,Z) is recorded in the Device Object's Display Location data item. The Device Object's contents are continually synchronized between the Device Objects sent by the Controller to the computing machine rendering the GUI and the one present in the Controller. Using location information, the graphical representation of the thermometer can be restored to previously set location whenever the GUI is invoked i.e after the user has dropped 520 to location 540, upon restarting the GUI or the Controller, 520 is located at location 540.

The GUI 300 in FIG. 6 shows the appearance of the GUI after all three devices: the thermometer, the humidity sensor and humidifier are connected to electrical power, their graphical representations on the GUI configured and moved to appropriate locations in the user's graphical schema by the user. 620 and 630 are graphical representations of the humidifier and humidity sensors, respectively.

Now, let us consider the method of configuring intelligence in the network. As an example of the function of the network, let us assume that the user wants the network consisting of the Zigbee enabled Controller, humidifier, thermometer and humidity sensor to work as follows:

Objective: During the months of January, February and March in 2014, between 8am and 4 pm, whenever the temperature in the family room is less than 65° F. and humidity in dining room is less than 60%, turn on the humidifier present in the living room.

In one embodiment, this involves the creation of a Command Object by computer executable instructions on the remote machine displaying the GUI, using the Device Objects representing the thermometer, humidifier and humidity detector. Let us explore this particular embodiment further:

Assume that the thermometer's Device Object has an Attribute TEMPERATURE. Its corresponding value is whatever is the most recent room temperature reported by the thermometer to the Controller. As discussed above, the thermometer's Device Object has the Given Name Family_Room_Thermometer.

Assume that the humidity sensor's Device Object has an Attribute HUMIDITY_PERCENTAGE. Its corresponding value is whatever is the most recent humidity reported by the humidity sensor to the Controller. The humidity sensor's Device Object has the Given Name Dining_Room_HumiditySensor.

Assume that the humidifier supports the commands TURN_ON and TURN_OFF. The humidifier's Device Object has the Given Name Living_Room_Humidifier.

The user performs the following actions to create the Command Object corresponding to the aforementioned network operation objective.

Consider FIG. 7:

1. Double click on 620. Drop-down menu 710 opens. Choose menu option ACTIONS 711. Drop down menu of list of commands 720 opens. Choose command TURN_ON 721. Drop down menu SCHEDULE 730 opens revealing options OPEN CALENDAR 731 and ALWAYS 732. Choose OPEN CALENDAR 731.

2. Using standard browser based appointment calendar and clock 733, select schedule of 8am-4pm for all days in January, February and March for 2014. This creates computer readable schedule data (hereinafter referred to as "Schedule Object").

3. Once schedule is selected, the Command is complete. The next step is to create the conditions that must be simultaneously true for the Command to be executed.

Drop down menu LINK OTHER DEVICES 740 opens with options STOP 741 and OTHER DEVICES 742. Choose OTHER DEVICES 742. A new graphical schema similar to 300 is displayed on screen. Select the thermometer by double clicking 520. 743 and 744 simply indicate the time sequence of operations with the action with the arrow pointing to the next action. Drop down menu of its Attributes, ATTRIBUTE 750 appears. Select Attribute TEMPERATURE 751. Drop down menu CONDITIONS 760 appears. Select condition IS GREATER THAN, 761. Input box 770 appears. Input number 65.

4. Drop down menu 740 re-appears allowing the humidity sensor, represented by 630, to be linked on the lines of linking the thermometer in step 3. Choose the CONDITION based on humidity Attribute as IS LESSER THAN and input 60.

5. Drop down menu 740 re-appears. Choose option 741 STOP.

6. Input box 780 appears for input. Input unique name for this operating intelligence, say, HUMIDIFIER_CONTROL_DURING_WINTER_DAYS. The Schedule Object created in step 3 is automatically assigned a unique name HUMIDIFIER_CONTROL_DURING_WINTER_DAYS_SCHEDULE.

Using computer executable instructions, the computing machine rendering the GUI translates the user actions into a Command Object with the Unique Name/Identifier HUMIDIFIER_CONTROL_DURING_WINTER_DAYS with the Command:

TURN_ON Living_Room_Humidifier as scheduled in HUMIDIFIER_CONTROL_DURING_WINTER_DAYS_SCHEDULE WHEN Family_Room_Thermometer's ATTRIBUTE TEMPERATURE IS LESSER THAN 65 AND WHEN Dining_Room_HumiditySensor's ATTRIBUTE HUMIDITY_PERCENTAGE IS LESSER THAN 60.

This Command Object is then transmitted to the Controller by the computing machine rendering the GUI. The Controller translates the Command Object into software applications of the type 150 and 151 which are notified by Network Sentience whenever Family_Room_Thermometer's Attribute TEMPERATURE and Dining_Room_HumiditySensor's Attribute HUMIDITY_PERCENTAGE change. Upon notification of such change, the software applications evaluate the conditions of the Command Object and validate the schedule of operations against the Controller's clock and calendar 161. When conditions are appropriate to issue the directive to the humidifier to turn on, the software applications issue the appropriate command to the humidifier using Zigbee protocol.

The Command Object can be read and processed by the computing engine rendering the GUI to display the graphical inputs that created the Command Object. Thus, a Command Object created at some time in the past may be edited and modified graphically.

A Command Object can also be duplicated and edited in order to build more complex Command Objects from simpler Command Objects.

Consider software applications represented by 150 and 151. Consider the Network Sentience 175. In one embodiment, Network Sentience 175 makes possible for one or more said software applications to discover the nature and capabilities of the devices operating in the network of machines. The software applications obtain from Network Sentience 175, an inventory of devices operating in the network of machines and supported attributes and supported commands of said devices.

In one embodiment, software applications represented by 150 and 151 obtain from Network Sentience 175, a list of Device Objects of the type represented by 160 and 161.

Downloadable Software Applications: Identical Software Applications Controlling Non-Identical Combinations of Connected Machines Consider the following problem: How can identical copies of a software application of the type represented by 150 and 151 adapt to a plurality of network configurations, where each unique network configuration has a different combination of connected devices and topologies?In other words, how can identical copies of a software application control non-identical combinations of connected machines?

As an example of this problem, consider the following: a Zigbee capable electrical outlet manufacturer intends that the electrical outlet be independently controlled from one or more specially designated, Zigbee capable ON-OFF switches. A user may have any number of such switches controlling the electrical outlet. The manufacturer provides the hardware and a downloadable software application that implements the functionality of a plurality of switches controlling the electrical outlet. Consider that person X bought the electrical outlet and one such controlling switch for his home. Consider that person Y bought four such controlling switches and the electrical outlet. Both persons download the identical software application to their Controller 110. User X intends for one switch to control to control the electrical outlet. User Y intends any of the four switches he bought to independently control the electrical outlet. How can the same software application function appropriately for both users who have automation networks of different configurations?

In one embodiment, the solution comprises of the software application of the type represented by 150 and 151 determining a list of compatible connected machines present in a network of connected machines and managing the operations of said machines. The software application of the type represented by 150 and 151 exchanges information with the Network Sentience 175 in order to determine a list of devices that are capable of being co-ordinated by the software application. In some embodiments, the information exchanged between the software application and Network Sentience may comprise: device capabilities and device identity. In particular, those skilled in the art will recognize that for devices supporting Zigbee technology, device capabilities may be conveyed by the Zigbee Cluster List. Device identity may include information such as manufacturer name, device type, device unique identity etc.

In the aforementioned example of controlling a Zigbee electrical outlet via a plurality of specially designated Zigbee ON-OFF switches, the user downloads the software application provided by the manufacturer to the Controller 110. The software application queries Network Sentience 175 and obtains a list of the specially designated switches already present in the network and also obtains information about the electrical outlets present in the network. The software application then requests Network Sentience 175 to report ON-OFF conditions from those specific specially designated switches. Upon receipt of an ON and OFF inputs from any of the switches, the software application directs the electrical outlets, if present to turn ON or OFF, respectively.

Manifest

A specific combination of connected machines from amongst a plurality of combinations can be designated to be controlled by a software application by providing said software application with information of the connected machines that are part of said specific combination. This information is referred to as the Manifest hereinafter. The Manifest may be thought of as a set of selection criteria or filters that can be used to select subgroups of connected devices in a network of connected devices.

In one embodiment, the Manifest consists of computer readable data pertaining to the connected machines that may be edited by the users of said software application.

In another embodiment, the Manifest consists of the identities of connected machines. The identity may consist of, but not limited to, a combination of one or more of the following elements of identity: Unique Device ID, IEEE ID assigned to the device, MAC ID assigned to the device, Model ID, Manufactured ID, User Given ID, Date of Manufacture.

In another embodiment, the Manifest consists of the capabilities of the device. The capability may consist of, but not limited to, the combination of one or more of the following elements of capability: supported Zigbee clusters, supported Zigbee attributes, supported Zigbee endpoints.

In another embodiment, the Manifest consists of a combination of identities and capabilities of the devices.

In another embodiment, the Manifest consists wildcards that may match a plurality of possible values for attributes in the Manifest. Those skilled in the art will recognize wildcards as patterns that match a plurality of values. For example, the Manifest may contain wildcards for the attribute Manufacturer Name in the Identity of compatible devices. Insofar as the Manufacturer Name is concerned, the Manifest in this example qualifies devices from any manufacturer that meets the rest of the criteria in the Manifest.

In some embodiments, software applications implementing automation logic are bundled with a Manifest. As part of initialization, the software application communicates with Network Sentience 175 and obtains from Network Sentience 175, the Device Objects corresponding to all the connected machines selected by the criteria in the Manifest. The software application also obtains from Network Sentience periodic or event-triggered reports of the Attributes corresponding to the connected machines selected by the criterion in the Manifest.

Customizing the Behavior of Software Applications to Fit the Network in which it is Deployed Using the Manifest Consider a variation of the problem discussed in section: Downloadable Software Applications: Identical Software Applications Controlling Non-Identical Combinations of Machines. In this case, consider that a user has two Zigbee electrical outlets, OutletA and OutletB, and four Zigbee electrical switches, Switch1, Switch2, Switch3 and Switch4. The user wants to control OutletA via switches Switch1 and Switch2; OutletB via switches Switch3 and Switch4. In another instance, the user may want to control OutletA with Switch1 and OutletB with switches Switch2, Switch3 and Switch4. How can a single software application provide both of the use cases described above?How can a software application of the type represented by 150 and 151 provide functionality that is customizable to the environment and specific operational goals in the network it is used in?

In one embodiment, a solution consists of providing a framework that passes to the software application controlling that controls a group of connected machines, a Manifest that specifies the configuration and identity of the devices that are intended to be controlled by said software application. As a result, the same software application or identical copies of the software application can control a plurality of combinations of devices in the network of machines, with each unique Manfiest directing the software application to control a correspondingly specific combination of connected machines.

Distribution of Automation Solutions as Self Configuring Software Applications Using the Manifest Can a user distribute a specific automation solution to millions of other users who are interested in that specific automation solution?

For example, a user creates an automation solution that makes a garden sprinkler head water conserving by logically pairing it with a separate soil moisture sensor and creating an automation logic that takes input from a connected moisture sensor and shuts off the sprinkler head when the lawn is sufficiently moist.

Can the user distribute this automation solution as a software application that runs on Controller 110 that automatically creates on each network that it controls, the same automation solution when the appropriate moisture sensor and sprinkler head are connected to the network?

In one embodiment, a solution consists of bundling the download software automation solution with a Manifest that specifies the network configuration in which the downloaded software automation solution is useful.

In some embodiments, the software application may be distributed by bundling it with a Manifest that specifies a network configuration than consists of an ON-OFF controllable sprinkler head and a moisture sensor so that the software application can automatically detect and control connected machines compatible with the software application.

The advantage of the Manifest is that it could be used to expand the use of the automation solution to newer and previously not considered hardware that is compatible with the automation software application. For example, by specifying the Manufacturer Name in the Identity object of the Manifest, the operation of corresponding downloadable automation software can be restricted to the specified manufacturer's machines. On the other hand, by using wildcards in the Manifest for Manufacturer Name in the Identity of compatible machines, the software can be used with similar machines made by a wide range of manufacturers.

Interface for Customization an Automation Software Application for a Specific Network of Connected Machines Consider the following problem: Using a simple interface, how does a user configure identical automation software applications to provide different functionality in different networks of machines?In other words, with a simple interface, how can a user customize the functionality of a generic software application that controls a network of machines to be applicable for his/her specific network of machines?

Consider also the following problem: In the context of the embodiments of the invention described in section [Customizing the Behavior of Software Applications to Fit the Network in which it is Deployed], how can a user customize the Manifest for the operational needs of his/her particular network of connected machines?

A solution involves the method consisting of:
(a) a software application whose functionality is customized by a user for his/her network, obtaining information of a plurality of compatible devices of present in the network from a central database, wherein in some embodiments, said information may include identification data such as Model Number, Manfuacturer ID, device type, IEEE Id and functional capability information such as Zigbee Cluster ID for said compatible devices
(b) the software application allowing the user to select a sub-set of devices from the list of compatible devices obtained in (a) by presenting the user with a series of selectable choices, wherein in some embodiments, the selected choices are placed in the Manifest.

Example of an Interface for Customization an Automation Software Application for a Specific Network of Connected Machines Consider a specific embodiment where a software application controlling some aspects of a network of connected machines must take inputs from different groups of devices and direct another group of devices to perform actions.

For example, consider a software application that monitors a group of network connected ON-OFF switches and a group of network connected motion sensors. The software application directs another group of network connected light bulbs to turn on when all ON-OFF switches in the monitored group are OFF and motion is detected by any of the motion sensors in the monitored group.

A user has a network that has 4 such ON-OFF switches, switches SwitchA through SwitchD, 4 such motion sensors MontionSensorA through MotionSensor D, and 2 such light bulbs LightBulbA through LightBulbB. The user wants to customize the aforementioned software application such that if switches SwitchA and SwitchB are both off and motion is detected by MotionSensorA or MotionSensor B, LightBulbA is turned on.

Consider that the aforementioned devices have been turned on and are in communication with the Controller 110. Network Sentience 175 is implemented on the Controller 110 and is aware of the identities and capabilities of the connected machines. The software application has a default Manifest that identifies that it can work with any number of connected machines that have at least one of the following capabilities: ON-OFF switch capability, Motion Sensor Capability and ON-OFF Output Capability.

(i) The user downloads the aforementioned software application to a computing platform that runs Network Sentience 175. In this example, the computing platform is the Controller 110. The user is shown a Graphical User Interface ("GUI") 800 in FIG. 8.

(ii) Consider FIG. 8.

(iii) GUI 800 is rendered on a computer monitor. The GUI is generated by a computer that takes input from a mouse and receives the content of the GUI from the Controller 110.

(iv) GUI 800 has pane 810 that shows downloaded but un-customized software applications waiting for user input. 811 is the graphical representation of the software application downloaded in step (i).

(v) GUI 800 has pane 820 that shows downloaded software applications that have already been configured and customized by the user. These are applications that are currently implementing automation in the user's network. 821, 822 and 823 are representations of software applications the user has already configured and customized for his/her network.

(vi) 830 is an organization pane in GUI 800 that shows various sub-groups of connected machines. In this example, the user has grouped the connected machines by floor plan. Sub-panel 831 shows a visual representation of the location of a sub-set of connected machines that are present on the ground floor of the user's property.

Similarly, sub-panels 832, 833, 834 and 845 show the visual representation of the location of the user's connected machines on other areas of the user's property.

(vii) 840 is the region of the GUI 800 that shows the layout of the user's network of connected machine on the ground floor. Selecting sub-panel 831 displays 840.

(viii) Rendered on 840 are representations of the layout of the kitchen 841, Dining Room 842 and Living Room 843.

(ix) The user clicks on 811.

(x) Software application represented in 811 is capable of working with Zigbee Light Switches, Zigbee Motion Sensors and Zigbee Light Bulbs. This inter-operability information is contained in the Manifest that is downloaded as a part of the software application. 811 communicates with Network Sentience 175 on Controller 100 and submits the inter-operability information to Network Sentience 175.

(xi) Network Sentience 175 scans its database for devices capable of working with software application 811 and renders on to GUI 800, the graphical representations of all compatible connected machines that can work with software application represented in 811.

(xii) Network Sentience 175 passes on to software application represented in 811, information about the set of all connected machines in the user's network that is compatible with software application represented by 811.

(xiii) As a result of steps (ix) through (xii), graphical representations 851 through 860 appear. 851 represents LightSwithA, 852 represents LightSwithB, 853 represents LightSwithC, 854 represents LightSwithD, 855 represents MotionSensorA, 856 represents MotionSensorB, 857 represents MotionSensorC, 858 represents MotionSensorD, 859 represents LightBulbA and 860 represents LightBulbB.

(xiv) 870 is a region in GUI 800 that allows the user to interact with software applications for configuration, customization and diagnostics.

(xv) 871 is a sub-region of 870 that prompts the user for actions and allows the user to input confirmation after completing the action by selecting the confirm button 872 or cancel button 873. 874 is a sub-region of 870 that shows helpful tips and suggestions to the user to assist in completing the required actions suggested in 871.

(xvi) The user right-clicks on 811 and selects the option Customize from the drop-down menu.

(xvii) The GUI 800 now takes the form as shown in FIG. 9. Consider FIG. 9.

(xviii) By way of messages in 871 and detailed suggestions in 874, the user is prompted to select the Light Switches to be monitored. Corresponding to this action, only those connected machines compatible with this action are shown in 840. The compatible connected machines in this case are represented by 851, 852, 853 and 854. Notice that machines 855 through 860 disappeared as they are not appropriate for selection as this step.

(xix) User selects LightSwitchA and LightSwitchB by double clicking on 851 and 852, respectively and signals completing of this step by double clicking confirm 872.

(xx) After successfully completing step (xix), the GUI 800 now takes the form as shown in FIG. 10. Consider FIG. 10.

(xxi) In a manner similar to the mechanisms of (xviii) through (xix), user selects motion sensors MotionSensorA and MotionSensorB for monitoring.

(xxii) In a manner similar to the mechanisms of (xviii) through (xix), user selects LightBulbA to be turned ON when the conditions that software application is monitoring are all true.

(xxiii) The user has successfully customized the logic of the software application to his/her network. The identities of the selected devices are recorded in the Manifest associated with the automation software application.

(xxiv) Once the Manifest is updated to reflect the user's customization, the automation software application configures itself to operate with the connected devices specified in user's input via the GUI. As a result, the software application has been configured for the user's specific network.

(xxv) If the GUI was rendered on a touch screen, mouse click inputs mentioned in steps (i) through (xxii) can be replaced by equivalent touch inputs.

Remote Configuration and Control of Automation Logic by User Interface Mirroring Consider the following problems:

How can one user configure, customize and implement automation for one or more geographically remote users?

Some embodiments of this general problem are:

(a) Can a user configure home automation for an aging parent in a different city or continent?

(b) Can a user remotely configure home and building automation for his/her clients as a business?

In one embodiment of a solution, multiple users may access the GUI that allows control and configuration of a given user's network. The same data and network configuration capabilities are shown simultaneously and in real time on multiple display devices that may be used by a number of users. Changes made in one are immediately reflected on all other users' interfaces. Thus collaborative network configuration across multiple geographies is possible.

In some embodiments of the solution, the command and control GUI interface provided by the Controller is mirrored on a server accessible via the internet. The user connects to the GUI published by webserver on the Controller 110. A remote user connects to the mirrored GUI available on a publicly accessible server. The remote user proceeds to configure the automation solution using the GUI for customizing the user's network automation logic. Since the changes are visible on both GUIs- remote and local in real-time, the remote user and local user can interact and collaborate.

Network of Networks of Connected Machines

A network of connected machines may have parts of the network in different geographic areas. For example, on each floor of a multistory hotel, there may be individual Zigbee networks with a single Controller. The Controllers on each floor may communicate with one another to form a network of networks. In this disclosure, the term network applies equally to a single network or any combination of networks forming a network of networks.

The invention claimed is:

1. A method of enabling users of a network of machines to create and implement a rule of operation of said network of machines via a graphical user interface, comprising the steps of:
   (a) a computer periodically querying the network or machines to learn the plurality of actions the machines can perform and the entities the respective machines can measure;
   (b) the computer presenting a graphical representation of a plurality of said queried machines on the graphical user interface;
   (c) firstly, the computer accepting from said graphical user interface an input that selects a machine from the network of machines and, in addition, selects an action from the superset of actions of the selected machine learnt by the querying executed in step (a);
   (d) secondly, the computer determining from the query of step (a) and the selection of step (c), a subset of the machine and their respective measurable entities on which the selected action of step (c) can depend on as a trigger to execute said action;
   (e) thirdly, the computer presenting on the graphical user interface, the graphical representation of the subset of machines and the subset of their respective measurable entities determined in step (d);
   (f) fourthly, the computer accepting as an input, a selection of a machine presented and in step (e) and one of its measurable entities presented in step (e);
   (g) fifthly, the computer accepting as an input an operating relationship between the machine whose action was selected in step (c) and the measurable entity selected in step (f);
   (h) sixthly, optionally, successively repeating step (e) through (g), with each iteration the specifying the operating relationship between the measurable entity selected in said iteration and the machine whose action is selected in step (c);
   (i) seventhly, the computer accepting input from the graphical user interface that signals that the building of the rule is complete;
   (j) finally, the computer querying and monitoring the measurable entities selected in step (f) and step (h), evaluating the operating relationship specified in step (f) and step (h);
   and when all said operating relationship evaluated to true, instructing the machine selected in step (c) to perform the action selected in step (c);
   whereby a given network of machines can be directed to function in a manner defined by the user specified action and user specified operating relationships between machines.

2. The method of claim 1 further comprising:
   (k) classifying the action that a machine in the network of machines performs at least one of the following categories:
       (i) turn on,
       (ii) turn off,
       (iii) set a configurable and measureable entity on said machine at a provide value;
   (l) identifying the machine which perform said action;
   (m) providing the operating relationship between a plurality of machines by providing a list of conditions that must simultaneously be true for the action to occur,
   Wherein each condition comprises:
       (i) a measurable entity provided on a selected machine in the network of machines;
       (ii) a conditional relationship provided on said measurable quantity using logical operators including at least one of NOT, AND, OR operators and arithmetic operators including at least one of greater than or equal to, less than or equal to, greater than, less than, or equal to;
   (n) optionally, providing a minimum duration of time for which all the conditions in the list of conditions must be true for the action to occur.

3. The method of claim 1 or claim 2 wherein said graphical representation of machine is presented as an icon on a spatial layout of the location of the network of machines; said layout comprising:
   (i) floor plans of the premises in which the machines are located.

4. The method of claim 1 or claim 2 wherein the rule of operation governing the machines in a network of machines comprises information elements:
   (i) a unique name or identifier to uniquely identify the rule of operation amongst a plurality of rules;
   (ii) description of an action that may be performed by a machine in the network of machines;
   (iii) a list of conditions involving a plurality of measurable entities provided on a plurality of machines in the network of machines;
   (iv) a temporal schedule for executing said action;
   whereby the rule of operation is rendered in computer readable form and thereby portable and distributable from one computer to another.

5. The method of claim 1 or claim 2 wherein the graphical user interface is rendered on multiple input-output devices, whereby the rule of operation is specified by multiple users in a collaborative and interactive fashion.

* * * * *